United States Patent [19]

Nair

[11] 4,377,840
[45] Mar. 22, 1983

[54] SCREEN-PRINTABLE DIELECTRIC COMPOSITION

[75] Inventor: Kumaran M. Nair, East Amherst, N.Y.

[73] Assignee: E. I. Du Pont de Nemours and Company, Wilmington, Del.

[21] Appl. No.: 361,263

[22] Filed: Mar. 24, 1982

Related U.S. Application Data

[63] Continuation-in-part of Ser. No. 169,496, Jul. 16, 1981, abandoned.

[51] Int. Cl.$^3$ .............................................. C04B 35/46
[52] U.S. Cl. ..................................... 361/320; 357/10; 361/321; 423/593; 501/42; 501/134; 501/135; 501/136; 501/137; 501/18; 501/20; 501/22
[58] Field of Search ............... 501/134, 135, 136, 137, 501/42, 18, 20, 22; 357/10; 361/312, 320, 321, 322; 423/593

[56] References Cited

U.S. PATENT DOCUMENTS

| | | | |
|---|---|---|---|
| 3,609,483 | 9/1971 | Smyly | 361/32 D |
| 3,847,829 | 11/1974 | Bouchard | 423/593 |
| 3,975,201 | 8/1976 | Greenstein | 501/22 X |
| 4,027,074 | 5/1977 | Cross et al. | 423/593 |
| 4,027,209 | 5/1977 | Maher | 501/134 X |
| 4,072,780 | 2/1978 | Zillman | 361/321 X |
| 4,158,219 | 6/1979 | Payne et al. | 361/321 |
| 4,218,723 | 8/1980 | Payne et al. | 501/137 X |
| 4,237,084 | 12/1980 | Payne et al. | 501/136 X |
| 4,308,570 | 12/1981 | Burn | 361/320 |
| 4,337,162 | 6/1982 | Payne et al. | 501/136 |

OTHER PUBLICATIONS

Holscher, Harry H., "The Relationship of Viscosity to Processing of Glass", Owens–Illinois Technical Center, Toledo, Ohio, Apr. 1968.

Dictionary of Ceramics by A. E. Dodd, pub. by Philosophical Library, Inc., NYC 1964, Perovskite, Barium Titanate, pp. 203-204 and p. 18.

*Primary Examiner*—Helen M. McCarthy

[57] ABSTRACT

Thick film dielectric compositions suitable for screen-printing comprising a perovskite, a bismuth-substituted pyrochlore, and a low temperature melting-devitrifiable glass. Upon firing the dielectric composition is highly hermetic.

14 Claims, No Drawings

SCREEN-PRINTABLE DIELECTRIC COMPOSITION

CROSS REFERENCE TO PRIOR APPLICATION

This application is a continuation-in-part of pending application Ser. No. 169,496 filed July 16, 1981 now abandoned.

FIELD OF THE INVENTION

The invention relates to thick film dielectric compositions and particularly to such compositions having good hermetic properties.

BACKGROUND OF THE INVENTION

The use of screen-printable dielectric compositions in paste form to form printed capacitors for use with silver-bearing terminations is relatively new in the art of constructing electronic systems. In general, such dielectric compositions contain a ferro-electric material, preferably $BaTiO_3$, glass, organic vehicle and optionally certain inorganic materials such as $ZrO_2$, $Fe_2O_3$, for example as Curie point shifters. Such compositions which are available commercially can be printed over precious metal electrodes and then be cofired with a top electrode to form capacitor. The stability of these printed capacitors is affected adversely mainly in two ways: (1) by low thickness; and (2) by water absorption. The dielectric thickness must be greater than a certain minimum value, depending on the maximum dielectric constant (K). The major dielectric property affected by a thin dielectric with moderately high K (defined here as a K of about 50 or above) is the insulation resistance (IR). Under load, very thin dielectrics show a decrease in IR values during aging. Thicker dielectrics generally do not show such a degradation in properties. Though it is not known with certainty, it is likely that this degradation in insulation resistance is related to the diffusion of ionic species from anode to cathode.

In addition, reversible absorption of water leading to ionization and migration of ionizable oxides is also a major problem of screen-printed capacitors. In the past, this has generally been eliminated by encapsulating the whole capacitor with organic or inorganic materials such a epoxy resins, silicones, glasses and the like. However, encapsulation processing is very costly and could be avoided with the development of a dielectric system which does not absorb moisture and, if moisture is absorbed, the materials in the system do not ionize and/or migrate species from the anode to cathode.

BRIEF DESCRIPTION OF THE INVENTION

In its broadest aspect, the invention embodies thick film screen printable heterogeneous compositions suitable for making hermetic thick film capacitors. These new composites consist of a pyrochlore ($A_2B_2O_7$) and perovskite ($ABO_3$) as crystalline functional phases and a low temperature melting devitrifiable glass as an amorphous functional phase.

The invention is therefore directed to a dielectric powder composition consisting essentially of an admixture of (a) a perovskite of the formula $ATiO_3$ in which A is selected from the group consisting of barium, calcium, strontium and lead, (b) a bismuth-substituted pyrochlore of the formula $Bi_{2-x}M_xM'_{2-y}M''_yO_{7-z}$ wherein M is a rare earth metal of atomic number 57 to 71, lead, cadmium, or yttrium,
M' is iron, galium or indium,
M" is antimony, tantalum or niobium,
X is a number in the range 0 to 1,
y is a number in the range 1 to 1.5 and
Z is a number in the range 0 to 0.5 and (c) a low temperature-melting devitrifiable glass.

In another aspect the invention is directed to printable thick film paste made from such powdered compositions. In a still further aspect the invention is directed to capacitors made from printed paste formulated from the above described dielectric powder compositions.

DETAILED DESCRIPTION OF THE INVENTION

A. Perovskite

The dielectric composition of this invention contains 10–65 parts by weight, based on the total weight of the composition, of perovskite and preferably 15–45 parts.

The perovskite can vary in both particle size and crystal structure. The crystal structure can be either cubic or tetragonal. The particle size can be 0.1 $\mu m$ to 4 $\mu m$. Preferably the powder particles are less than 2 $\mu m$ in size and have tetragonal crystal structure, as determined by X-ray diffraction. The major impurities as determined by emission spectroscopy (>100 ppm) are Zn, Ca and Sr ions.

B. Pyrochlore

The second major component of the dielectric composition of this invention is a pyrochlore of the formula $Bi_{2-x}M_xM'_{2-y}M''_yO_{7-z}$ M is a rare earth metal of atomic number 57 to 71, lead, cadmium, or yttrium,
M' is iron, galium or indium,
M" is antimony, tantalum or niobium,
X is 0 to 1,
y is 1 to 1.5 and
Z is 0 to 0.5

The pyrochlore is used at a level of 10–70 parts by weight and preferably 35–55 parts. The particle size can be 0.5 $\mu m$ to 8.5 $\mu m$ with a preferred average of 3 $\mu m$. The major impurities as determined by X-ray diffraction are antimony oxides. The pyrochlores for use in the invention are preferably those having the formula $Bi_2M'M''O_7$, wherein M' is iron or indium and M" is antimony or niobium. They are described in detail and made by the procedure described in U.S. Pat. No. 3,847,929 to Bouchard.

C. Devitrifiable glass

The devitrifiable glass component of the dielectric compositions of this invention is a devitrifiable, low-softening point glass which is used at a level of 1–20 parts by weight, preferably a 5–15 parts level and even more preferably at a level of 6–8 parts. By low-softening point glass is meant a glass having a softening point below 850° C. and preferably below 600° C. as measured by the fibre elongation method (ASTM-C338-57). The glass utilized in this invention also has to have a low viscosity at the firing temperature to aid liquid phase sintering of inorganic particulates and must be devitrifiable during the firing cycle and specifically at the cooling part of the firing cycle. In particular, it should have a specific viscosity (log $\eta$) at the firing temperature of less than 6, and be capable of aiding liquid phase sintering of $BaTiO_3$ and $Bi_2FeSbO_7$ particles.

Typical examples of glasses meeting the above criteria are lead germinate glasses containing, by weight, 50–80% $Pb_3O_4$ and 10–30% $GeO_2$. A particular preferred glass contains 78.5% $Pb_3O_4$ and 21.5% $GeO_2$.

The glasses are prepared by conventional glass-making techniques, i.e., by mixing the desired components in the desired proportions and heating the mixture to form a melt. As is well known in the art, heating is conducted to a peak temperature and for a time such that the melt becomes entirely liquid and homogeneous. In preparing the compositions of the invention, the components are premixed by shaking in a polyethylene jar with plastic balls and then melted in a platinum crucible to 800°–850° C. The melt is heated at the peak temperature for a period of 1 to 1½ hours. The melt is then poured into cold water. The maximum temperature of the water during quenching is kept as low as possible by increasing the volumetric ratio of water to melt. The crude frit after separation from water is freed of residual water by drying in air or by displacing the water with methanol. The crude frit in slurry form is then ball-milled for 3–5 hours in alumina containers using alumina balls. Alumina picked up by the materials, if any, is not within observable limits as measured by X-ray diffractional analysis.

After discharging the milled frit slurry from the mill, excess solvent is removed by decantation and the frit powder is air dried at room temperature. The dried powder is then screened through a 325 standard mesh screen to remove any large particles.

The major functions of the frit are to aid liquid phase sintering of the inorganic crystalline particulate materials and to form noncrystalline (amphorous) or crystalline materials by devitrification during the heating-cooling cycle (firing cycle) in the preparation of thick film capacitors. This devitrification process can yield either a single crystalline phase having the same composition as the precursor noncrystalline (glassy) material or multiple crystalline phases having different compositions from that of the precursor glassy material. From 1 to 20% by weight glass is needed in the invention compositions.

D. Formulation

The dielectric powder compositions described above will ordinarily be formed into paste which is capable of being printed in any desired circuit pattern. In its simplest aspects such pastes are made merely by dispersing the dielectric powder mixture into an appropriate liquid vehicle.

Any inert liquid can be used as the vehicle. Water or any one of various organic liquids, with or without thickening agents, stabilizing agents and/or other common additives can be used as the vehicle. Exemplary of the organic liquids which can be used are aliphatic alcohols, esters of such alcohols such as the acetates and propionates, terpenes such as pine oil, terpineol and the like, solutions of resins such as the polymethacrylates of lower alcohols, or solutions of ethyl cellulose in solvents such as pine oil and monobutyl ether of ethylene glycol monoacetate. The vehicle can also contain volatile liquids to promote fast setting after printing to the substrate.

A preferred vehicle is based on ethyl cellulose and beta-terpineol in a weight ratio of about 1:8. The pastes are conveniently prepared on a three-roll mill. A preferred viscosity of these compositions is approximately 100–200 Pa.S, measured on a Brookfield HBT viscometer using a #5 spindle at 10 rpm. The amount of vehicle utilized is determined by the final desired formulation viscosity.

E. Applications

The dielectric compositions of this invention can be printed as film onto substrates on which a Pd/Ag conductor composition has been previously printed and fired at 850° C., either by using an automated printer or a hand printer in the conventional manner. Preferably, automatic screen stenciling techniques are employed using a 120 to 325 mesh screen. The following procedure is used for producing a thick film capacitor:

1. The silver-bearing electrode composition is printed using an automatic printer, dried at an elevated temperature such as 120° C. for approximately 15 minutes and then fired in air in a belt furnace at a peak temperature of approximately 825°–925° C. for 10 minutes, the total firing cycle being 1–1.5 hours. The fired thickness is 10–14 μm, as measured in a surfanalyzer;
2. One layer of the dielectric composition is printed over the silver-bearing electrode film using a double wet pass with a squeegee and dried at an elevated temperatures such as 125° C. for approximately 15 minutes;
3. A second layer of the dielectric composition is printed over that of the first layer and is also dried at 125° C. for 15 minutes;
4. The silver-bearing electrode composition is then printed on the top of the dielectric layer, and dried at 125° C. for approximately 15 minutes. The two dielectric layers and the top silver electrode are cofired in air in a belt furnace at a peak temperature of approximately 825°–950° C. for 10 minutes, the total firing cycle being one to 1–1.5 hours. The fired thickness of the two dielectric layers together is 30–60 μm, as measured in a surfanalyzer.

Screen-printed cofired multilayer capacitors can also be made with the compositions of the invention by the following procedure: (1) print an electrode layer, dry and fire; (2) print a dielectric layer atop the fired electrode layer and dry it; (3) print an electrode layer overlying the dielectric layer and dry it; and (4) repeat steps 2 and 3 for the desired number of layers; and (5) cofire the assemblage comprising a plurality of alternating printed dielectric and overlying electrode layers.

The silver-bearing electrode compositions used in this invention are comprised of silver powder, palladium powder, frit, and a vehicle formulated as is well known in the art of thick film technology.

F. Definitions and Test Procedures

1. Dielectric Constant (K)

Dielectric constant is a measure of the ability of a dielectric material to store an electrical potential energy under the influence of an electrical field. Thus the ratio between the capacitance of a capacitor with the material as dielectric (ceramic in this case) to the capacitance with a vacuum as the dielectric.

2. Dielectric Material

Dielectric material is a nonconducting material or insulator that separates electrical charges and can result in the storage of an electrical charge.

3. Dissipation Factor (DF)

Dissipation factor is a measure of internal power losses due to conduction through the dielectric from one lead to the other. This power loss results in the thermal dissipation of electrical energy which is undesirable because it raises the temperature of the device.

4. Insulation Resistance (IR)

Insulation resistance is a measure of electricity leakage through the dielectric. The D.C. resistance is measured at a fixed voltage applied across the terminals of the circuit (unit).

5. Temperature Capacitance Coefficient (TCC)

The temperature capacitance coefficient is a measure of the rate of change of capacitance as a function of temperature. In particular it is the slope of the curve which result from the plot of capacitance versus temperature.

Capacitance and dissipation factors are measured using a Hewlett-Packard HP4274A multi-frequency LCR meter, while insulation resistance is measured using Super megohm meter Model RM 170 (Biddle Instruments, AVO Ltd., U.K.). Insulation resistance measurements are made after charging the capacitor with 100 VDC. Each number is the average of at least 10 measurements. The thickness of the dielectric layer is measured using Gould surfanalyzer 150/recorder 250. The dielectric constant is calculated using the equation:

$$K = (C/A) \cdot t$$

where C is the capacitance of the capacitor

A—is the area of small electrode in contact with the dielectric layer.

t—is the thickness of the dielectric layer.

All capacitors were aged for at least 15 hours after firing before making the electrical measurements. It is common that the dissipation factor (DF) decreases downward from 0.5 to 2% within this aging time period. The capacitance is generally unaffected during this period.

The reversible absorption of water leading to high DF and low IR of the capacitors is evaluated using a water immersion test. This test is used as the measure of the hermeticity of the capacitor.

Three sets of capacitors are immersed in water at a temperature of 50° C. and kept under water for a maximum of 10 days. A "2095 Bath and Circulater" of Master line, Forma Scientific is used for the test. The first set of capacitors is taken out afer a period of 24 hours, the second set after 5 days and the third set after 10 days. Surface water is wiped off using micro-wipes and insulation resistance is measured after charging the capacitor with 100 volts DC. Capacitors are allowed to recover and the insulation resistance is remeasured. The same set of capacitors is then immersed in water for an additional 10 days and the insulation resistance is measured again. Capacitors aged under water which show little drop in the insulation resistance are deemed to have good hermeticity.

The exact mechanism of the improvement of hermeticity in thick film capacitors is not known; however certain mechanisms such as ionic processes can be postulated. The lowering of insulation resistance when the capacitors are exposed to humidity is probably related to an ionization diffusion of cations from the anodic electrode into the dielectric via grain boundaries, pores and voids toward the cathodic electrode. This ionization-ionic migration process is pronounced in the case of electrode compositions containing easily ionizable oxides. Another possible explanation is related to the sintered density of the thick film, in that a dielectric thick film with tight microstructure and little or no porosity is likely to retard such ionic migration, thus increasing the hermeticity.

The addition of the claimed inorganic devitrifiable glass alters the densification characteristics of the thick film dielectric layer. The low-softening point, low-viscosity properties of the glass utilized in the dielectric compositions of the invention aid the sintering of the inorganic particulates by forming liquids during the firing cycle and wetting the particulate surfaces. Also, the triple points of the sintered body all contain liquid during the sintering. The devitrification property of the glass aids in the formation of crystalline or amorphous inorganic material from the glass, thus leaving the sintered body with little or no glass. Ionic migration through the glass structure containing ionizable "network modifiers" is relatively much higher than that of the same composition in crystalline form. The tight sintered density and pore-free microstructure of the thick film capacitor composition claimed in this invention are dependent on the viscosity of the glass, the devitrification characteristics of the glass (temperature, time, etc. needed to convert to crystalline material) and the type of inorganic ions present in the glass. The hermetic property of the invention is related to the sintered density of the thick film capacitor as well as the presence of nonionizable inorganic (modifiers) in the glass. The low TCC values of the invention as well as its ferroelectric properties are due to the presence of the pyrochlore.

The dielectric thick film formulations having such good hermetic properties therefore find use in a wide variety of microcircuit applications without the necessity of encapsulation.

The invention will be further understood by reference to the following examples which illustrate the dielectric properties and hermeticity obtainable when the compositions of the invention when they are printed and fired with silver-bearing electrode compositions. The details for fabricating a thick film capacitor are described above. The table below gives compositional information and dielectric properties for capacitors terminated with silver-bearing conductor compositions. In the following examples the vehicle constituted about 24% by weight of the total printable paste of which 14% by weight was beta terpineol and ethyl cellulose "B" in a ratio by weight of about 8:1 and 10% by weight was organic liquid consisting of about equal amounts of beta terpineol and butyl carbitol. The formulations also contained 1% by weight of Tyzor® AA[1], a titanium resinate anti-peeling agent.

[1]. Tradename of E. I. du Pont de Nemours and Company, Wilmington, Delaware 19898.

EXAMPLES

EXAMPLES 1-3

A series of three dielectric compositions was formulated with an inert liquid vehicle at successively higher levels of perovskite and correspondingly lower levels of pyrochlore. Each was used to fabricate a thick film capacitor by the procedure described above. The resultant capacitor was then tested to determine its dielectric properties using the test procedures also described herein above. The formulations and test results are shown in Table 1 below.

TABLE 1

| | 1 | 2 | 3 |
|---|---|---|---|
| Formulation | | | |
| $BaTiO_3$ | 23 | 35 | 45 |
| $Bi_2FeSbO_7$ | 43 | 33 | 23 |
| $Pb_5Ge_3O_{11}$ glass | 7 | 7 | 7 |
| Vehicle | Balance | Balance | Balance |
| Dielectric Properties | | | |
| Dielectric Constant | 58.9 | 92.4 | 143 |
| DF (%) | 0.6 | 0.9 | 1.3 |
| TCC (ppm/°C.) | +533 | +650 | +1216 |
| IR (Ω) | $>1 \times 10^{10}$ | $>1 \times 10^9$ | $>1 \times 10^{10}$ |
| IR (Ω) after 10 days under $H_2O$ at 50° C. | $>1 \times 10^7$ | $>1 \times 10^6$ | $>1 \times 10^6$ |

Each of the capacitors had desirably low TCC and dielectric constant values.

EXAMPLES 4–6

A further series of three dielectric compositions was formulated using an inert liquid vehicle with successively lower levels of perovskite and correspondingly higher levels of pyrochlore. Each was used to fabricate a thick film capacitor and evaluated by the same procedure as Examples 1–3. The results of which are given in Table 2 below.

TABLE 2

| | 4 | 5 | 6 |
|---|---|---|---|
| Formulation | | | |
| $BaTiO_3$ | 25 | 20 | 15 |
| $Bi_2FeSbO_7$ | 43 | 48 | 53 |
| $Pb_5Ge_3O_{11}$ | 7 | 7 | 7 |
| Organic Vehicle | Balance | Balance | Balance |
| Dielectric Properties | | | |
| K | 116 | 80 | 60 |
| DF | 0.9 | 0.6 | 0.5 |
| IR (Ω) initial | $>1 \times 10^9$ | $>1 \times 10^9$ | $>1 \times 10^9$ |
| TCC | +380 | 163 | +90 |
| IR (Ω) After 24 hours | — | $>1 \times 10^8$ | $>1 \times 10^8$ |
| After 5 days | — | $>1 \times 10^7$ | $>1 \times 10^8$ |
| After 10 days | — | $>1 \times 10^5$ | $>1 \times 10^8$ |

Again the TCC values were desirably low at each level of dielectric constant and the IR levels were quite acceptable at each level of capacitance.

EXAMPLES 7–11

A further series of five dielectric compositions was formulated using organic vehicle with varying concentrations of perovskite, pyrochlore and two different nongermanate glasses. Each was used to fabricate a thick film screen printed capacitor and evaluated by the same procedure as Examples 1–3. The results are given in Table 3 below:

TABLE 3

| | 7 | 8 | 9 | 10 | 11 |
|---|---|---|---|---|---|
| Formulation | | | | | |
| $BaTiO_3$ | 15 | 51.1 | 51.1 | 0 | 0 |
| $Bi_2FeSbO_7$ | 53 | 0 | 0 | 51.1 | 51.1 |
| $Pb_5Ge_3O_{11}$ | 7 | 23.9 | 0 | 0 | 0 |
| Frit A (1) | 0 | 0 | 23.9 | 23.9 | 0 |
| Frit B (2) | 0 | 0 | 0 | 0 | 23.9 |
| Organic Vehicle | Balance | Balance | Balance | Balance | Balance |
| Dielectric Properties | | | | | |
| K | 34 | 193 | 186 | 16 | 15 |
| IR (Ω) initial | $>10^{13}$ | $>10^9$ | $>10^9$ | $>10^9$ | $>10^9$ |
| IR (Ω) after 24 hours | $>10^{10}$ | $>10^6$ | $>10^6$ | $>10^7$ | $>10^5$ |
| IR (Ω) after 10 days under $H_2O$ at 50° C. | $>10^8$ | $>10^6$ | $>10^5$ | $>10^5$ | $>10^5$ |

| (1) Composition of Frit A | | (2) Composition of Frit B | |
|---|---|---|---|
| $Bi_2O_3$ | 82% | $Bi_2O_3$ | 75.1 |
| PbO | 11% | PbO | 10.9 |
| $B_2O_3$ | 3.5% | $SiO_2$ | 9.3 |
| $SiO_2$ | 3.5% | CaO | 2.4 |
| | 100% | $B_2O_3$ | 1.2 |
| | | $Al_2O_3$ | 1.1 |
| | | | 100% |

In the case of samples 8 to 11, there were many shorts: i.e., insulation resistance was close to zero when a 100 V DC potential was applied across the terminals.

Results clearly show that the combination of $BaTiO_3$, $Bi_2FeSbO_7$ and $Pb_5Ge_3O_{11}$ gives the best insulation resistance after the capacitors are immersed under water at 50° C. for 10 days.

I claim:

1. A dielectric powder composition for making hermetic dielectrics having an insulation resistance (IR) drop of less than 4 orders of magnitude after submersion in water at 50° C. for 10 days consisting essentially of a finely divided admixture of (a) a perovskite of the formula $ATiO_3$ in which is A is selected from the group consisting of barium, calcium, strontium and lead, (b) a bismuth-substituted pyrochlore of the formula $Bi_{2-x}M_xM'_{2-y}M''_yO_{7-z}$ wherein M is a rare earth metal of atomic number 57 to 71, lead, cadmium, or yttrium M' is iron, gallium or indium M" is antimony, tantalum or niobium, X is a number in the range 0–1, y is a number in the range 1–1.5 and Z is a number in the range 0–0.5 and (c) a low temperature-melting devitrifiable glass having a specific viscosity (log η) of less than 6 at the firing temperature in which the glass has a softening point below 600° C. and in which the relative proportions of the components, by weight, are 10–65% (a) 10–70% (b) and 1–20% (c).

2. The composition of claim 1 in which the perovskite is $BaTiO_3$.

3. The composition of claim 1 in which the pyrochlore is $Bi_2FeSbO_7$.

4. The composition of claim 1 in which the glass is 50–80% by weight $Pb_3O_4$ and 10–30% by weight $GeO_2$.

5. A screen-printable dielectric composition for making hermetic dielectrics having an insulation resistance (IR) drop of less than 4 orders of magnitude after submersion in water at 50° C. for 10 days consisting essentially of (a) a perovskite of the formula $ATiO_3$ in which is A is selected from the group consisting of barium, calcium, strontium and lead, (b) a bismuth-substituted pyrochlore of the formula $Bi_{2-x}M_xM'_{2-y}M''_yO_{7-z}$ wherein M is a rare earth metal of atomic number 57 to 71, lead, cadmium, or yttrium M' is iron, gallium or indium M" is antimony, tantalum or niobium, X is a number in the range 0–1, y is a number in the range 1–1.5 and Z is a number in the range 0–0.5 and (c) a low temperature-melting devitrifiable glass having a specific viscosity (log $\eta$) of less than 6 at the firing temperature dispersed in an inert liquid vehicle in which the glass has a softening point below 600° C. and in which the relative proportions of the components, by weight, are 10–65% (a) 10–70% (b) and 1–20% (c).

6. The composition of claim 5 in which the perovskite is $BaTiO_3$.

7. The composition of claim 5 in which the pyrochlore is $Bi_2FeSbO_7$.

8. The composition of claim 5 in which the glass is 50–80% by weight $Pb_3O_4$ and 10–30% by weight $GeO_2$.

9. An hermetic dielectric film of the composition of claim 5 which (a) has been fired to remove the inert liquid and to effect liquid phase sintering and (b) cooled to effect divitrification of the glass.

10. The film of claim 9 in which the perovskite is $BaTiO_3$.

11. The film of claim 9 in which the pyrochlore is $Bi_2FeSbO_7$.

12. The film of claim 9 in which the glass is 50–80% by weight $Pb_3O_4$ and 10–30% by weight $GeO_2$.

13. An hermetic capacitor having an insulation resistance (IR) drop of less than 4 order of magnitude after submersion in water at 50° C. for 10 days and comprising (1) a first conductor terminal on which is printed (2) an hermetic dielectric film and (3) a second conductor terminal overlying the dielectric film, the dielectric layer consisting of (a) a perovskite of the formula $ATiO_3$ in which is A is selected from the group consisting of barium, calcium, strontium and lead, (b) a bismuth-substituted pyrochlore of the formula $Bi_{2-x}M_xM'_{2-y}M''_yO_{7-z}$ wherein M is a rare earth metal of atomic number 57 to 71, lead, cadmium, or yttrium M' is iron, gallium or indium M" is antimony, tantalum or niobium, X is a number in the range 0–1, y is a number in the range 1–1.5 and Z is a number in the range 0–0.5 and (c) a low temperature-melting devitrifiable glass, having a specific viscosity (log $\eta$) of less than 6 at the firing temperature the assemblage having been cofired to remove the inert liquid therefrom and to effect liquid phase sintering and then cooled to effect devitrification of the glass in which the glass has a softening point below 600° C. and in which the relative proportions of the components, by weight, are 10–65% (a) 10–70% (b) and 1–20% (c).

14. An hermetic multilayer capacitor having an insulation resistance (IR) drop of less than 4 order of magnitude after submersion in water at 50° C. for 10 days and comprising a first conductor terminal and a plurality of alternating printed dielectric layers and overlying conductor terminals, the dielectric layers consisting of (a) perovskite of the formula $ATiO_3$ in which is A is selected from the group consisting of barium, calcium, strontium and lead, (b) a bismuth-substituted pyrochlore of the formula $Bi_{2-x}M_xM'_{2-y}M''_yO_{7-z}$ wherein M is a rare earth metal of atomic number 57 to 71, lead, cadmium, or yttrium M' is iron, gallium or indium M" is antimony, tantalum or niobium, X is a number in the range 0–1, y is a number in the range 1–1.5 and Z is a number in the range 0–0.5 and (c) a low temperature-melting devitrifiable glass, having a specific viscosity (log $\eta$) of less than 6 at the firing temperature the assemblage having been cofired to remove the inert liquid therefrom and to effect liquid phase sintering and then cooled to effect devitrification of the glass in which the glass has a softening point below 600° C. and in which the relative proportions of the components, by weight, are 10–65% (a) 10–70% (b) and 1–20% (c).

* * * * *